C. VON PHILP.
FORGING PRESS.
APPLICATION FILED DEC. 21, 1910.

1,029,081.

Patented June 11, 1912.

Witnesses:
C. P. La Gay
Francis A. Stanton

Inventor
Casimir von Philp
By his Attorneys
Kinney, Muslick

C. VON PHILP.
FORGING PRESS.
APPLICATION FILED DEC. 21, 1910.

1,029,081.

Patented June 11, 1912.
11 SHEETS—SHEET 10.

C. VON PHILP.
FORGING PRESS.
APPLICATION FILED DEC. 21, 1910.

1,029,081.

Patented June 11, 1912.
11 SHEETS—SHEET 11.

Fig. 12

UNITED STATES PATENT OFFICE.

CASIMIR von PHILP, OF SOUTH BETHLEHEM, PENNSYLVANIA, ASSIGNOR TO BETHLEHEM STEEL COMPANY, OF SOUTH BETHLEHEM, PENNSYLVANIA, A CORPORATION OF PENNSYLVANIA.

FORGING-PRESS.

1,029,081.  Specification of Letters Patent.  Patented June 11, 1912.

Application filed December 21, 1910. Serial No. 598,606.

*To all whom it may concern:*

Be it known that I, CASIMIR VON PHILP, a citizen of the United States, residing at South Bethlehem, Pennsylvania, have invented certain new and useful Improvements in Forging-Presses, of which the following is a specification, accompanied by drawings.

The invention relates particularly to forging presses having intensifiers whereby a portion of the stroke may be made under very great pressure, and it comprises means for very effectively and efficiently utilizing power derived from a suitable fluid medium, such for example as steam, for operating the press.

In the preferred embodiment of the invention steam as a prime source of power is utilized in three different ways for a combined result. It is used to pump water into an accumulator chamber under control of an automatic valve for stopping the pumping operation when the chamber is substantially filled. It is also used to act on a piston and plunger to produce the effective working pressure in the accumulator chamber and force the water therefrom as demands for it are made upon the accumulator. The steam is also used to act on a piston and actuate an intensifier plunger and thereby produce very great pressure in the hydraulic cylinder for giving the final squeeze or pressure in the press.

The invention and its several parts are applicable to other uses than presses, but I will describe the same in connection with presses and from this description the use of the invention in other apparatus to which it may be applied will be readily understood.

In the accompanying drawings the application of the invention to a forging press having a vertically reciprocating cross-head is illustrated to show the invention in one of its preferred forms.

Fig. 8 is a sectional view on line 8—8 of Fig. 7 showing the inlet pilot valve and operating connections therefor. Fig. 8$^a$ is a horizontal section on line $a$—$a$ of Fig. 8.

Figure 1:
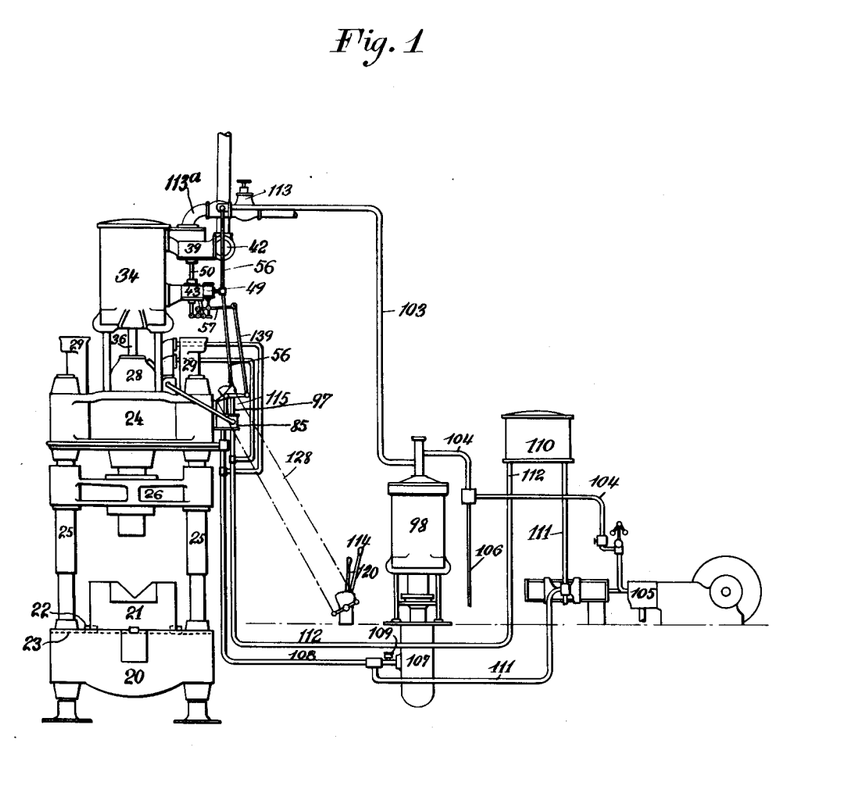
Figure 1 is a general side view, partly diagrammatic and omitting some details, of a forging press and its connections embodying my invention in one preferred form.

Referring first to Fig. 1, the reference numeral 20 denotes the base of the press carrying the anvil 21 which may be locked in its position by means of wedge blocks 22 which slide in a groove 23. The entablature 24 is supported above the bed by suitable supporting columns 25 upon which slide the cross head 26 which carries the die. The columns are locked or clamped to the bed and the entablature in any suitable manner. Cast integral with the entablature is the main hydraulic cylinder 28 on either side of which there is, suitably supported, a pull back cylinder 29 having a pull back piston 30 secured to the cross head by the piston rod 31, see Fig. 2.

Within the hydraulic cylinder moves the ram 32 which carries the cross head 26 aforesaid. The hydraulic cylinder 28 is provided with water under pressure from the accumulator through duct 33 leading to the annular space above the ram 32. At 34 is the steam intensifier having a piston 35 and a piston rod or plunger 36, which enters the hydraulic cylinder 28 through a suitable stuffing box. The steam intensifier is bolted or otherwise secured to the entablature 24 and is provided with a steam inlet 37 and a steam outlet 38 communicating with the main steam valve cylinder 39 in which moves a piston valve 40 having a piston rod 41.

Figure 2:
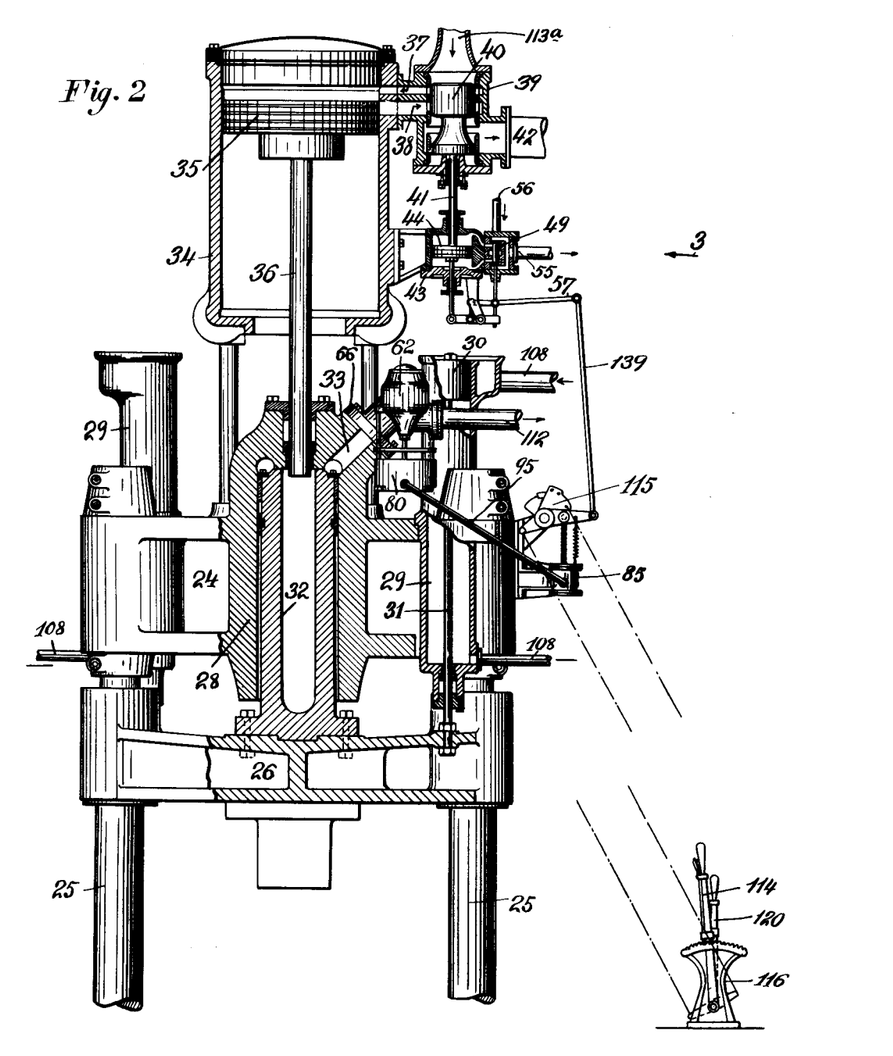
Fig. 2 is a detail view on larger scale of certain parts of the press above the bed and with some parts in section and some parts omitted.
Figure 3:
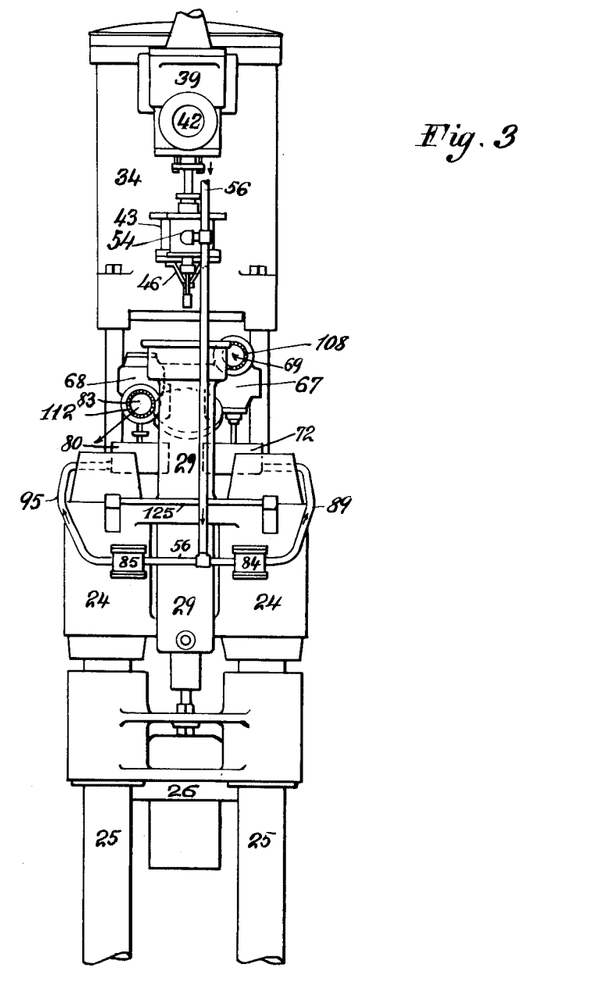
Fig. 3 is a front view looking in the direction of arrow 3 of Fig. 2 with some details omitted.
Figure 4:
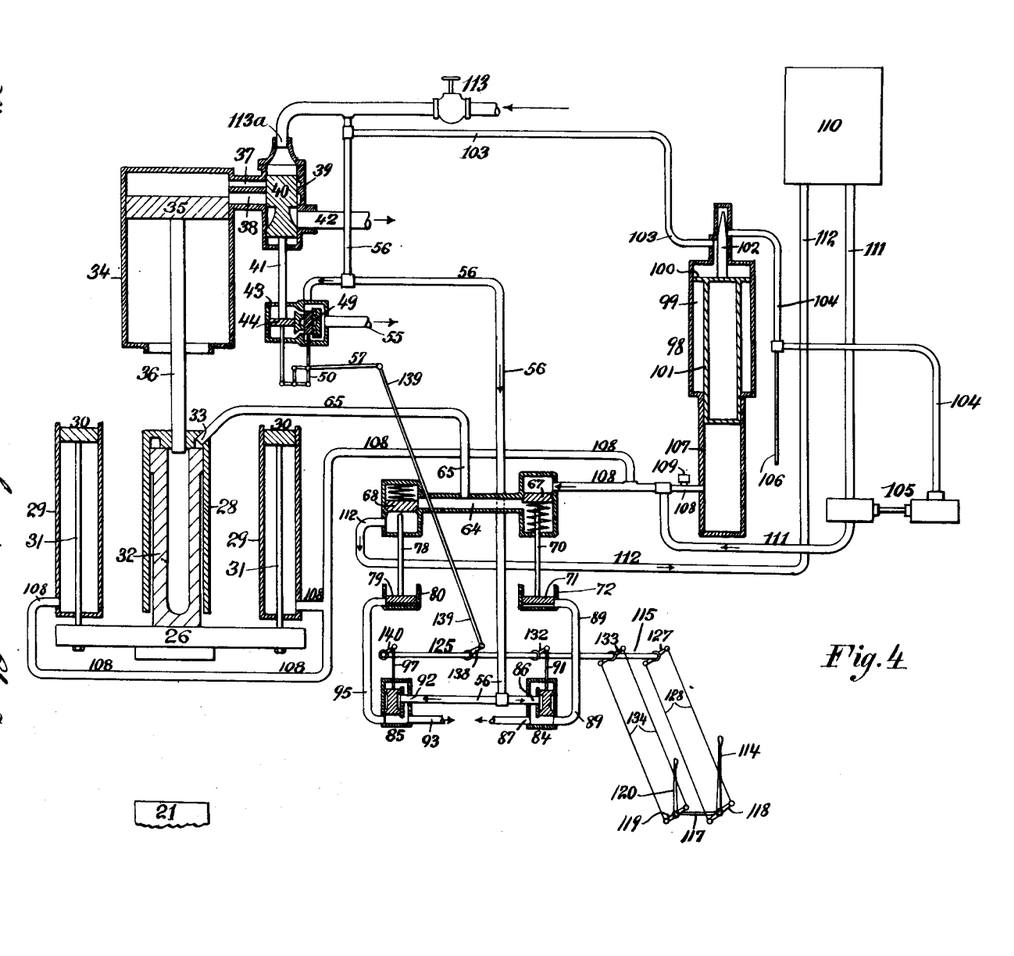
Fig. 4 is a diagram of connections and is not intended to correctly show structures.

When the exhaust 38 is closed by the position of the piston 35 as shown in Fig. 2 then the steam remaining on top of the intensifier piston 35 forms a cushion to prevent the piston from striking the head of the cylinder. The exhaust pipe from the main steam valve 39 is shown at 42.

Figure 6:
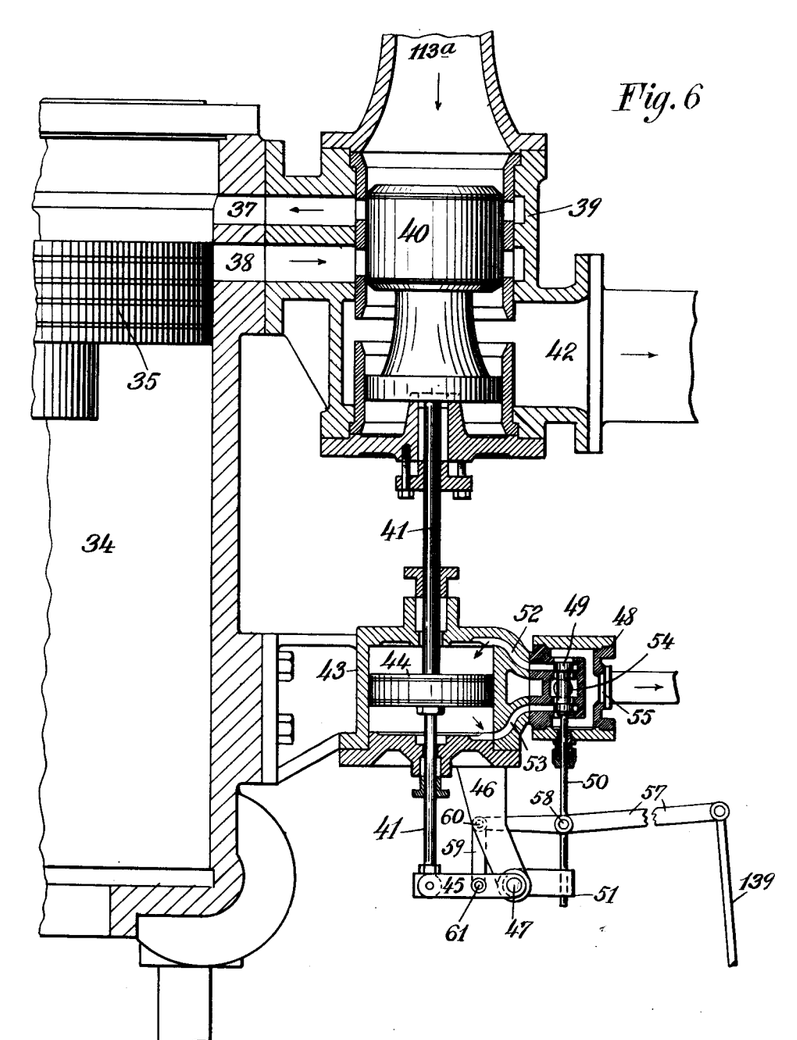
Fig. 6 is a detail view of the valves for operating the intensifier.
Figure 7:
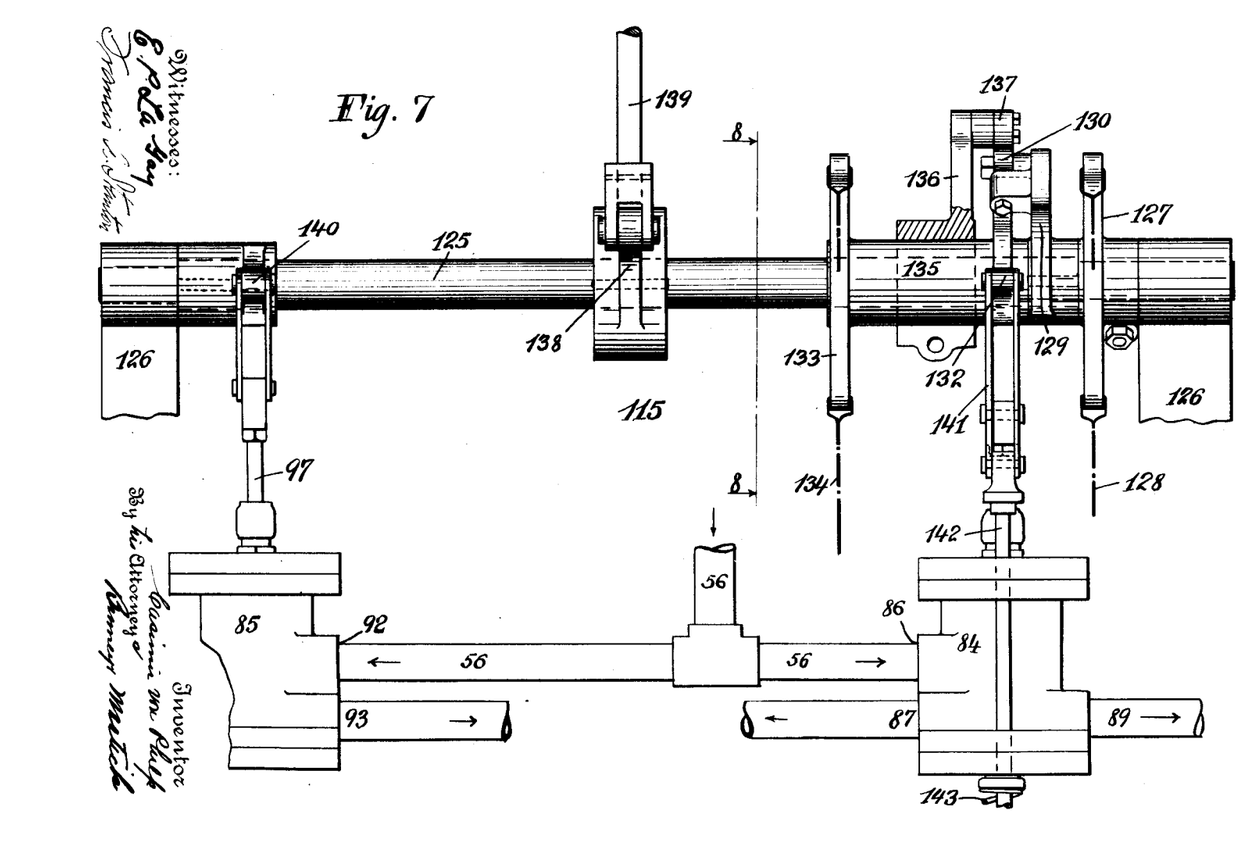
Fig. 7 is a detail view of part of the valve gear for operating the press.

For operating the piston valve 40 I have provided an auxiliary steam cylinder 43 having piston 44 carried by the piston rod 41,—see also Fig. 6—which passes through the steam cylinder 43 and is pivoted to the free end of a lever arm 45 pivoted to a bracket 46 at 47.

The auxiliary steam cylinder for operating the main steam valve 39 is actuated by means of a pilot valve 49 on a valve stem 50, the lower end of which is guided at 51. The pilot valve casing 48 communicates with the steam cylinder 43 by way of the two ducts 52 and 53. The steam inlet to the valve is at 54 and the exhaust at 55. Steam is taken directly to the operating valve from steam pipe 56, see Fig. 1.

The pilot valve is operated by means of a floating lever 57. The pilot valve stem 50 is pivoted to the lever 57 at 58 and a link 59 connects the inner end of the lever 57 to the aforesaid arm 45 by the upper and lower pivots 60 and 61.

Figure 5:
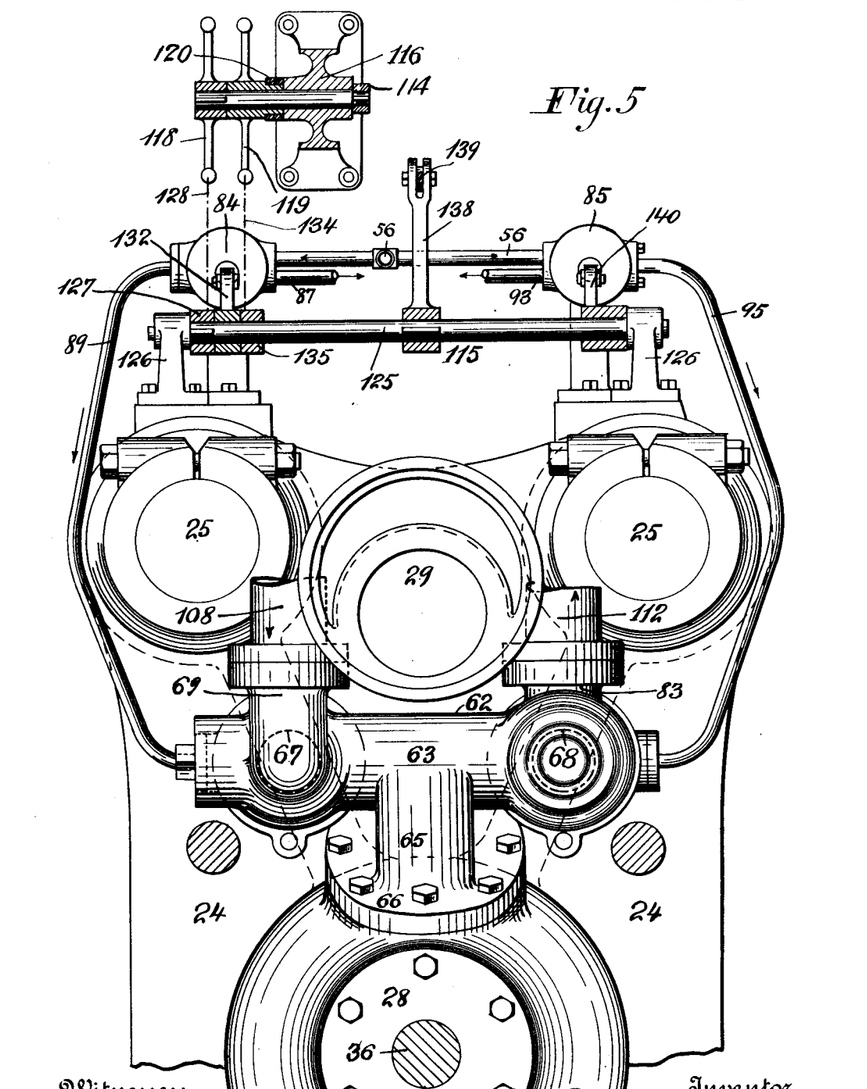
Fig. 5 is a general view of some of the parts; the arrangement of the hand lever stand 116 and its connections being alternative to that shown in Fig. 14.
Figures 8, 8A:
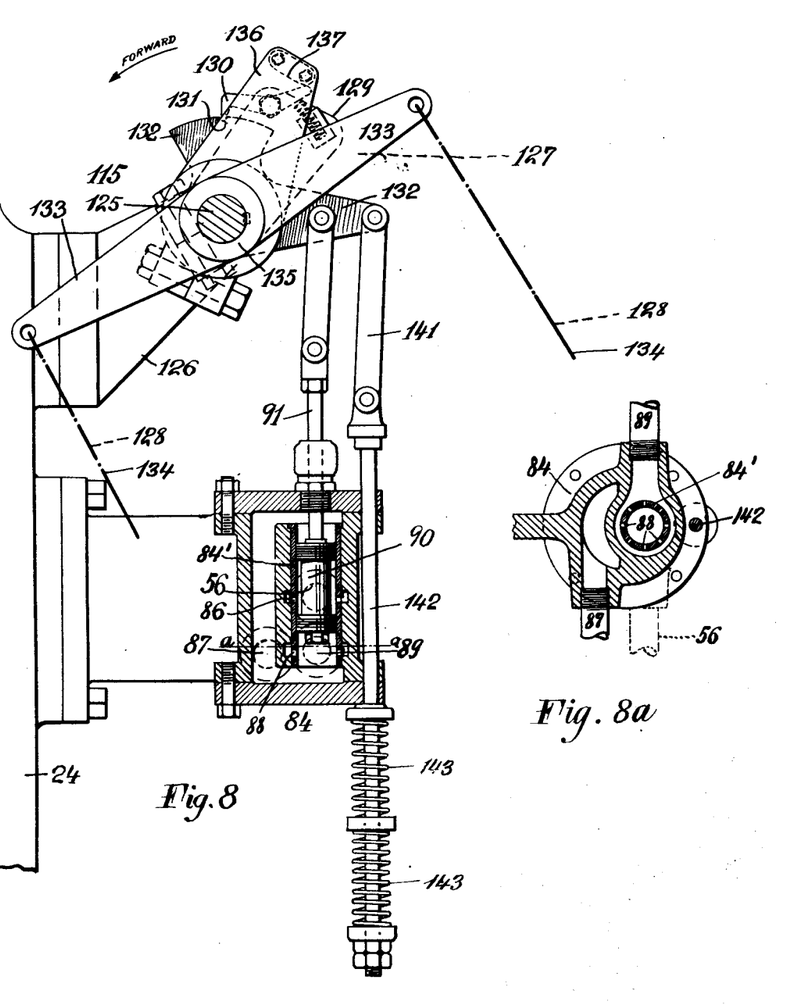
Figure 9:
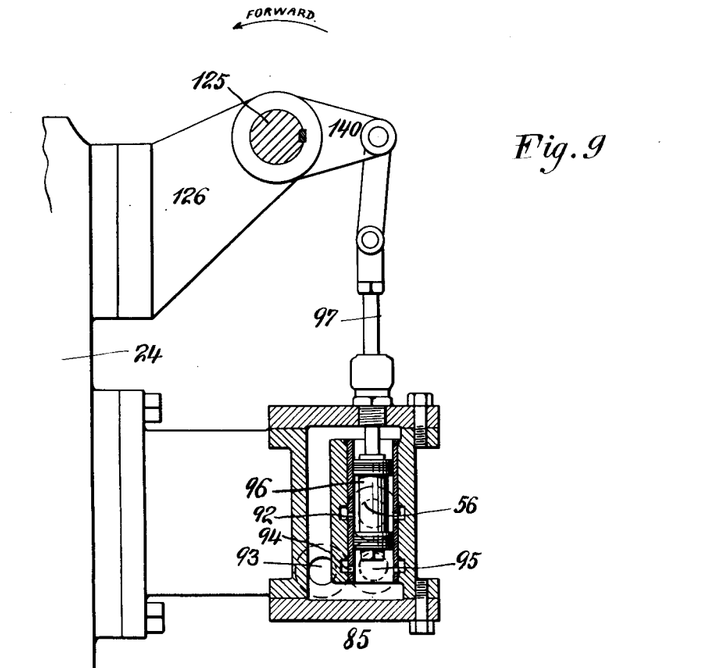
Fig. 9 is a view similar to Fig. 8 of the outlet pilot valve.
Figure 10:
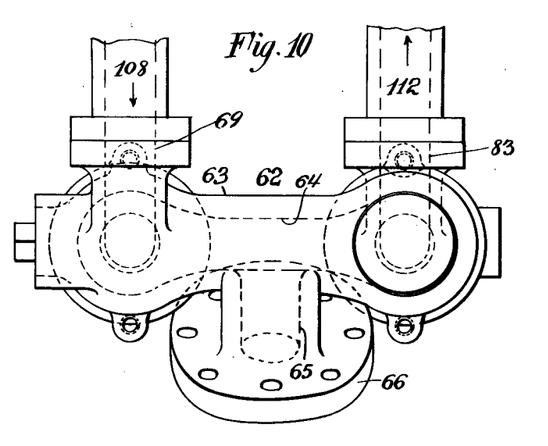
Fig. 10 is a plan view of the inlet and outlet water valve casing and connections for the water to operate the ram and crosshead.
Figure 11:
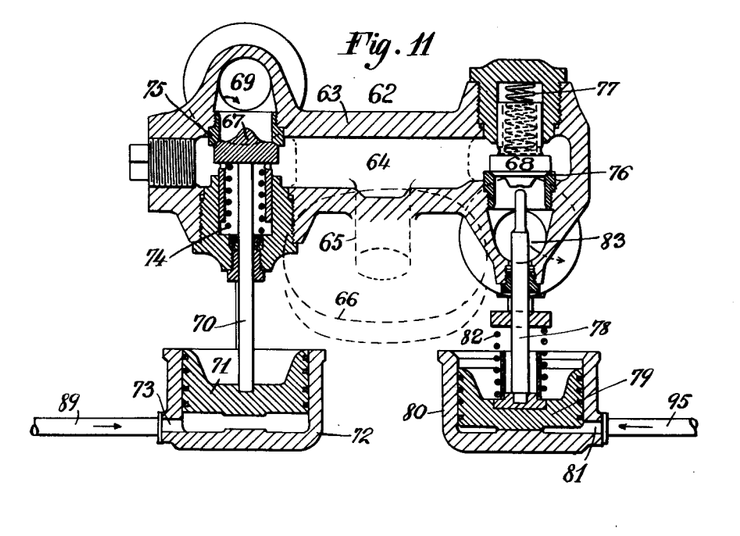
Fig. 11 is a vertical sectional view of Fig. 10 showing such inlet and outlet valves and immediate connections.

This device operates as follows: When the lever 57 is moved upward by rod 139 it works around the pivot 60 as a fulcrum and lifts the pilot valve 49 permitting steam to pass from the inlet 54 through passage 52 to the cylinder 43, and exhausting steam through passages 53, 55, moving the piston 44 therein downward. This movement however in addition to moving the main valve 40 also causes the arm 45 to swing downward around its fulcrum 47 thereby pulling the end of lever 57 down at 60 and restoring the pilot valve 49 to closed position shutting off the steam from the passage 52. This motion can be continued as long as the lever 57 is moved upward and until the piston 44 has reached the bottom of the cylinder 43, the main inlet valve 40 being thereby adjusted with nicety by rod 139 to any position thereby readily controlling piston 35 as desired. The reverse motions will be clear from the above. The hydraulic ram 32 carrying the cross head 26 is operated directly by the water pressure admitted into the hydraulic cylinder 28 through duct 33, which communicates with the hydraulic valve mechanism 62, see Figs. 5, 10 and 11. This valve mechanism comprises a casing 63 containing a main passage 64 which communicates with the passage 33 aforesaid by means of a branch passage 65. A flange 66 is provided for bolting the casing 63 to the cylinder 28 as seen in Figs. 2 and 5. The passage 64 communicates at one end with the hydraulic inlet valve 67 and at its other end with the hydraulic outlet valve 68. These valves are hereinafter also termed the water inlet and outlet valves respectively. The water inlet valve 67 is a check valve adapted to close the water inlet 69 and is partly controlled by a valve pin 70 the lower end of which is actuated by piston 71 which moves in a steam cylinder 72 having a steam duct 73. A spring 74 tends to close and seat the valve 67 on its seat 75. The valve is held shut or is allowed to act as an automatic check valve by letting steam in or out of the cylinder 72. When the piston 71 is at the bottom of the cylinder 72 the valve 67 is free to open against the spring 74 to let in the water pressure and then acts as a check valve and will close when the intensifier action commences thus preventing back flow of the water. Water is supplied at 69 to this valve by a pipe 108 leading from an accumulator cylinder 107, Fig. 1. The water outlet valve 68 is closed on its seat 76 by the spring 77, and the valve is lifted and opened by means of a valve stem or pin 78 actuated by a piston 79 moving in a steam cylinder 80 having a steam duct 81. When steam enters the cylinder the valve 68 is opened and when the steam is let out the valve is closed by the spring. The spring 82 is provided to assist the weight of the piston 79 in quickly exhausting the steam and closing the valve. When the outlet valve 68 is open, communication is established from the passage 64 through the water outlet 83 and pipe 112. This pipe 112 connects the outlet 83 with the water supply tank 110 of the accumulator. The two water valves 67, 68 control the inlet and outlet of water to and from the hydraulic cylinder 28. The supply of steam to the valve cylinders 72 and 80 for the opening and closing of the valves 67 and 68 is controlled by two steam pilot valves 84 and 85, of which 84 is the inlet pilot valve shown in Fig. 8 and 85 is the outlet pilot valve shown in Fig. 9. Fig. 7 shows both of the valves with their operating mechanism, and Fig. 5 shows in plan view the location of the valves and their connections.

The inlet pilot valve 84 (see Figs. 5 and 8) comprises a piston valve proper 90 which at each end is enlarged and fits and travels in a cylindrical way 84' open at each end as shown, set into the valve casing. In the wall of this way 84' are two sets of ports 86 and 88. Ports 86 are the steam inlet ports connected with steam pipe 56. Ports 88 are the cylinder ports connected to pipe 89 leading to steam cylinder 72 controlling the water inlet 69 by valve 67. The interior of the valve casing 84 is connected to an exhaust outlet or pipe 87. At its lowest position the piston valve 90 allows the live steam to pass from inlet ports 86 to the ports 88 and thus to the cylinder 72 raising piston 71 and holding the water inlet valve closed against the water pressure. At the position shown in Fig. 8 and higher positions of the piston valve 90 it will be seen that the ports 88 are in free communication with the interior of the valve casing and the exhaust pipe 87 so that the steam exhausts from the cylinder 72 leaving valve 67 to the control of the spring 74. The piston valve 90 is moved by piston rod 91 linked as shown to the lever arm 132.

The outlet pilot valve 85 is constructed very similarly. It has steam inlet ports 92 supplied from pipe 56, an exhaust outlet 93 and ports 94 which lead by pipe 95 to the outlet water-valve steam cylinder 80 controlling outlet 83 and its valve 68 also shown in Figs. 5 and 11. The operation of the pilot piston 96 by its stem 97 linked to arm 140 is similar to that above described for the inlet pilot valve. The valves 84 and 85 are both supplied with steam from the pipe 56.

It will be seen that when the pilot valves 84 and 85 are operated, steam is supplied to or exhausted from the steam cylinders 72 and 80 of the water inlet and outlet valves 67 and 68 respectively which in turn supply to or let out the water from the hydraulic cylinder 28 as above explained.

Figure 12:
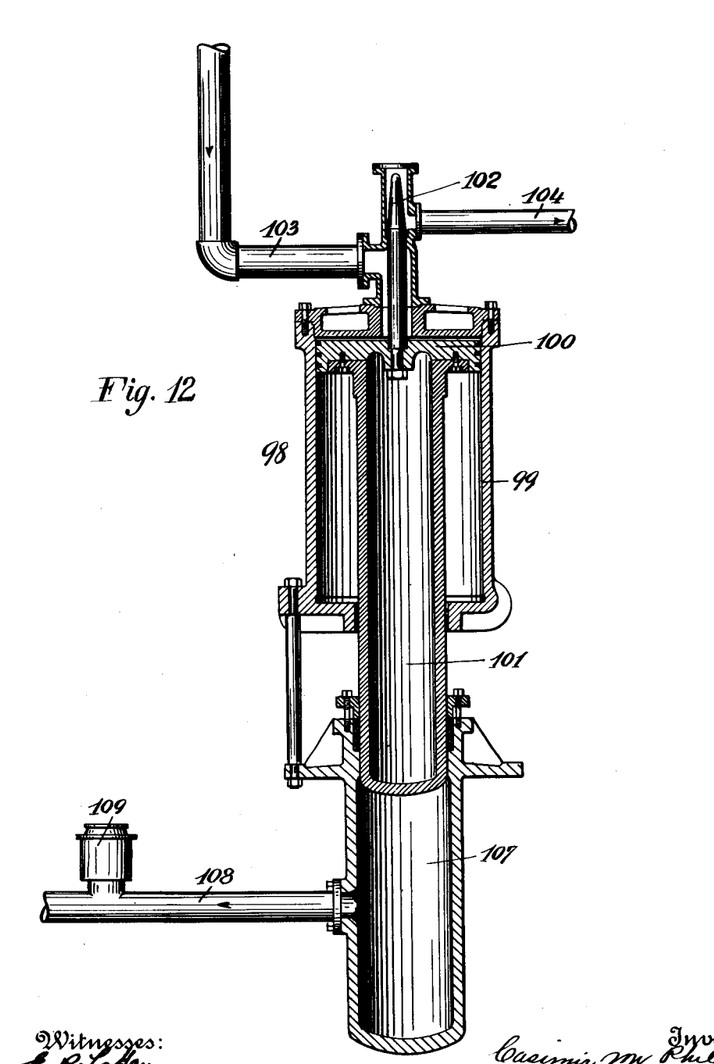
Fig. 12 is a sectional view of the accumulator.

The water for operating hydraulic ram 32 is supplied from an accumulator 98, shown in Figs. 1 and 12, and which comprises a steam cylinder 99 in which moves a piston 100 carried by a plunger 101. The piston carries on its top a tapered plug valve 102. There is a constant steam pressure supplied on top of the piston 100 by the pipe 103 from the main steam supply pipe. A pipe 104 supplies steam from the pipe 103 and plug valve 102 to operate the pump 105. A drain pipe 106 is also provided. The accumulator further comprises a water cylinder 107 having a connecting pipe 108 with a safety valve 109. The water is pumped to the accumulator through pipe 111 and pipe 108 from a suitable tank 110 by means of force pump 105 operated by steam through pipe 104. The said pipe 108 leads to the aforesaid water inlet valve 67 and also to the pull back cylinders 29. The pipe 112 connects the outlet water valve 68 with the tank 110.

The operation of the accumulator is as follows:—When the main steam supply is opened at 113, Fig. 1, steam passes through pipe 103 to the accumulator steam cylinder 99 forcing down the piston and plunger 100 and 101 and opening the tapered plug valve 102. This opens the passage for the steam through pipe 104 to the force pump 105. The latter commences to work and pumps water from the tank 110 through pipes 111 and 108 into the accumulator water cylinder 107, lifting the plunger 101, piston 100 and tapered plug 102 against the steam pressure. When the water cylinder 107 is nearly full of water, the tapered plug valve is in position to cut off steam from the pipe 104 leading to the pump 105, thus stopping the latter. The system therefore stores water under elastic pressure of the steam pressed plunger 101, in the accumulator. This pressure is constant and fixed by the steam pressure. Further, the accumulator is automatic in its action, because whenever the piston 100 moves down, the tapered plug opens the way for the steam supply to the pump, and the latter starts up, and water is again pumped into the accumulator.

One object of the accumulator is to supply water at a pressure let us say, of 300 to 500 lbs. to the inch for the closing stroke of the press before the greater pressure is needed for the final forging under intense pressure. The steam intensifier piston 35 and plunger 36 supply the necessary intense pressure, say 6,000 to 9,000 lbs., on the ram 32 after the water inlet and outlet valves are closed. If the whole stroke had to be accomplished at maximum pressure a great and unnecessary loss of power in the closing stroke would result.

The operation of the press is primarily controlled by means of a lever 114 which actuates a valve gear 115 which operates the pilot valves 84 and 85 which in turn actuate the water inlet and outlet valves 67 and 68. The floating lever 57 is also operated by this same valve gear 115 by means of a connecting rod 139.

Figure 14:
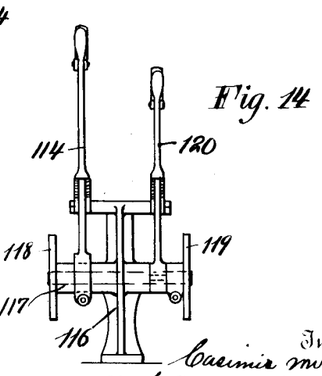
Fig. 14 is a view thereof looking from left of Fig. 13.

The operating lever 114 is, as seen in Fig. 14, mounted in a lever stand 116 in which is journaled a shaft 117 at the ends of which there are mounted an operating arm 118 and a setting arm 119. The operating lever 114 is clamped to the hub of the operating arm 118 to move therewith said hub being mounted to turn loosely on the said shaft. The setting arm 119 is clamped to the shaft and the setting lever 120 is keyed thereto. Or as seen in Fig. 5 arm 118 and lever 114 may be keyed upon opposite ends of shaft 117, while lever 120 is clamped upon the hub of arm 119, the latter being loose upon the shaft.

The usual spring latches and notched quadrant plates are provided to hold the levers in various positions.

The valve gear 115 comprises a shaft 125 journaled in brackets 126, 126 secured to the entablature 24. Clamped to this shaft is a shaft lever 127 connected with ropes or chains 128 to the operating arm 118 and lever 114 on the lever stand. Adjacent to the arm 127 and keyed to the shaft 125 is a pawl arm 129 carrying a spring actuated pawl 130 adapted to engage a notch 131 on the bell crank arm 132 which is connected to the valve stem 91 of the inlet pilot valve 84 as seen in Fig. 8. The valve arm 132 is loose on the shaft 125.

The end of the arm 132 carries a link 141 which is secured to a rod 142 the lower end of which is actuated by springs 143 adjusted to return it to substantially the lower end of its stroke. The object of this is to restore the piston 90 to the lowest position to positively close the inlet valve 67 when the arm 132 and the piston have been released by the pawl 130.

Adjacent the arm 132 there is further provided a cam setting lever 133 turning with the cam arm 136 loosely on the shaft 125 and connected by ropes 134 to the setting lever 120 on the lever stand 116. On the hub 135 of the lever 133 there is clamped the cam arm 136 to which is bolted the cam 137 which coöperates to disengage the pawl 130 as will be explained presently.

About midway on the shaft 125 there is keyed an arm 138 which operates the floating lever 57 by means of a link 139. Consequently the hand lever 114 also directly adjusts the lever 57 and controls the main steam valve 40 of the steam cylinder 34.

The pilot valve 85 for the outlet water valve 68 is directly operated from the shaft 125 by an arm 140 keyed to said shaft and connected to the stem 97 of the valve.

Figure 13:
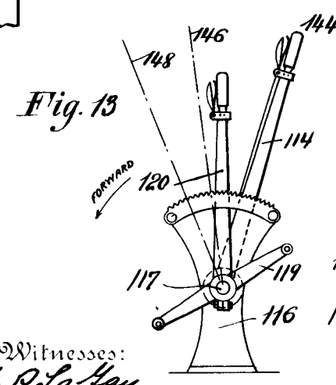
Fig. 13 is a side view of the operating lever stand.

In now describing the operation of the valve gear 115 " forward " movements will mean movements to the left in Figs. 8 and 13 as indicated by the arrows.

The press operates as follows it being assumed that the operating lever 114 on the lever stand is in the position shown at 144, Fig. 13, and shaft 125 consequently rocked to the right or backward, Fig. 8, holding the main piston valve 40 up to cut off the intensifier from the steam supply but open it to the exhaust pipe 42, the auxiliary piston 44 being at the top of the auxiliary cylinder 43 and the main steam supply open at 113, 113ª. Steam passes through pipe 56 to the inlet and outlet pilot valves 84 and 85 and thence to pistons 71 and 79 for the water inlet and outlet valves 67 and 68 thus opening the outlet valve 68 of the main cylinder 28 and positively holding the inlet valve 67 closed. The steam also passes to the accumulator 98 and the pump 105 operating the pump so as to keep the chamber 107 of the accumulator substantially filled with water as explained in detail above. The accumulator being in direct communication with the pull back cylinders 29, the water under the effect of the steam pressure cylinder 99 of the accumulator holds the pull back pistons 30 and consequently the cross head 26 and ram 32 at the upper limit of their strokes. The press is now ready for the forging stroke. Now assume that the operating lever 114 is moved to an intermediate position 146, Fig. 13 and through the ropes 128 and shaft lever 127 the shaft 125 rotated forward, moving arms 140 and 138 and the pawl arm 129 and pawl 130 in the same direction. The pawl, engaging the notched arm 132, also carries that arm around forwardly, assuming that the pawl does not yet reach a position to be disengaged from the arm 132 by passing under the adjustable setting cam 137 controlled by the setting hand lever 120. The pistons 90 and 96 of the pilot valves are therefore raised by the movement described to the positions for example shown in Figs. 8 and 9. Consequently steam is exhausted from both cylinders 72 and 80 controlling the water inlet and outlet valves 67 and 68 and the outlet valve closes by its spring 77, and the water pressure from the accumulator opens the inlet valve 67 and operates ram 32 to close the dies upon the work forcing the ram and the cross head down and simultaneously raising the piston 35. Whenever the pawl 130 on the further movement of shaft 125 by lever 114 strikes and is disengaged by cam 137 from the notch in the arm 132, the piston 90 is automatically forced down by the springs 143, Fig. 8. Thereby steam is again admitted through the pilot valve inlet 86 and ports 88 to the pipe 89 leading to cylinder 72 and the piston 71 thereby closes the water inlet valve 67 against the water pressure. This stops the inflow of the water and terminates the light downward stroke of the ram 32. By moving the lever still farther forward for example to position 148, the floating lever 57 is so far raised by operating arm 139 as to cause the auxiliary valve piston 44 to descend together with the main piston valve 40 sufficiently to admit steam through port 37 on top of the intensifier piston 35. As this latter moves downward under the pressure of the steam the small plunger 36 thereof enters the ram chamber 28 causing intensified pressure of the confined water therein and causing a very powerful further downward movement of the ram 32 and cross head whereby the forging stroke is accomplished under the delicate and accurate control of the valve 40 as desired.

The return stroke may be effected as follows:—The operating lever 114 may be moved back all the way to the initial position 144. This by means of the floating lever 57, pilot valve 49 and piston 44 raises the main valve 40 and opens the exhaust from the intensifier relieving the pressure on the water in the ram 32. At the same time by lowering the piston 96 in outlet pilot valve 85 and so admitting steam under the outlet valve piston 79 the water outlet valve 68 is opened for the water to pass out from the hydraulic cylinder 28, and the water from the accumulator 98 acting freely in the pull back cylinders 29 raises the ram and cross head. The parts are now ready for another closing and forging stroke and the pawl 130 will again engage the arm 132. When the cross head is operated as above described it moves up and down delivering at will successive strokes to the material to be forged.

The setting lever 120 is connected to so adjust the position of cam 137 as to enable the operator either to cause pawl 130 to disengage and the water inlet to be closed and held closed when the operating lever 114 reaches any desired intermediate position in its forward movement or else by placing the lever 120 at the forward limit of its movement to prevent entirely the disengagement of the pawl. In the latter case the ram will continue its descent to its limit or until stopped by the resistance of the work, and after operating the intensifier in a downward stroke and moving lever 114 back enough to open the intensifier exhaust, water will again flow into the ram cylinder through the inlet check valve 67 during the upward stroke of the intensifier plunger 36 thus tending to press and hold the cross head downward which will allow repeated intensifier strokes to be made with an automatic advance of the cross head during each as much as it can advance at each working stroke of the intensifier plunger, the lever 114 being given to and fro motions sufficient only to operate the valve 40 suitably, without opening the water outlet valve of the ram. When however the cam 137 is used to disengage the pawl at any point water will not pass into the ram until after the pawl has been again engaged. Consequently the intensifier plunger may be operated up and down moving with it the cross head and ram up and down proportionately with the aid of the pull back cylinders and without allowing water to either pass in or out of the ram cylinder. Therefore the intensifier can at will be operated to give repeated strokes with or without successive advances of the die, and without opening the outlet to cause the larger retracting stroke of the ram. Also it will be seen that the intensifier strokes may be very accurately and nicely governed by the valve 40 from the same lever 114 that controls the longer strokes of the ram. Also the opening light stroke of the ram can be stopped at any point and the closing stroke started without raising the ram all the way.

All the mechanism and connections from the lever 114 should be proportioned, as will now readily be seen, to act in the following succession during forward movement; the water outlet valve piston falls and valve closes, next the water inlet valve piston falls and the inlet valve opens, next the intensifier exhaust 38 closes, next the intensifier inlet opens. In reverse movement the intensifier inlet closes, next its outlet opens, next water inlet valve piston rises holding valve closed, next water outlet valve piston rises opening the outlet valve. If however the pawl has been disengaged as explained from notch 131 and arm 132 it should reëngage toward the end of the backward stroke of the lever 114 before the water outlet opens in order to insure its being reëngaged ready for the next forward movement whenever the backward movement of the lever has gone far enough to let out water and raise the cross head preparatory to another stroke. It will be seen from this that in the opening stroke of the ram it can be stopped at any point and again closed, by means of lever 114. Consequently it will be now seen that this invention provides without using the cam 137 different ranges of adjustment of the control lever 114 along its quadrant, namely: one range that controls the light stroke of the ram to and fro, stopping it at any points desired, and another range that controls the intensifier permitting the ram to maintain the advances made by the intensifier strokes as explained above.

With the use of the cam a variation can be established wherein at a desired position on the forward movement the inlet water valve closes positively and the intensifier can be used to move the cross head up and down as explained.

I claim the following:—

1. The combination of a main ram cylinder an intensifier cylinder, piston and plunger, acting on the main cylinder, an accumulator for supplying the main cylinder comprising a water chamber and a steam cylinder, piston and plunger for acting on the water to produce the pressure, a water supply pump therefor, means for actuating the pump and a control valve therefor actuated with the said piston and plunger of the accumulator, valve mechanism for controlling the main cylinder, valve mechanism for controlling the intensifier and connections for jointly operating both said valve mechanisms.

2. The combination of a main ram cylinder an intensifier cylinder, piston and plunger, acting on the main cylinder, an accumulator for supplying the main cylinder comprising a water chamber and a steam cylinder, piston and plunger for acting on the water to produce the pressure, a water supply pump therefor, means for actuating the pump and a control valve therefor actuated with the said piston and plunger of the accumulator and valves for controlling the main cylinder and the intensifier.

3. In combination, a main hydraulic cylinder, an intensifier therefor, an accumulator supplying the hydraulic cylinder an inlet check valve for controlling the inlet to the hydraulic cylinder and means for holding closed or leaving free said check valve at will and means for jointly controlling both the main cylinder and the intensifier.

4. In combination, a main hydraulic cylinder, an intensifier therefor, an accumulator supplying the hydraulic cylinder a pull back cylinder in constant communication with the accumulator, an inlet check valve controlling the inlet to the hydraulic cylinder, means for positively closing or holding closed the said check valve, valve mechanism for controlling the intensifier, and a single lever and operating connections for successively releasing the check valve from said positive means and then closing the intensifier exhaust and opening the intensifier inlet.

5. In combination, a main hydraulic ram cylinder, an intensifier therefor, an accumulator supplying the hydraulic cylinder a pull back cylinder in constant communication with the accumulator, an inlet check valve controlling the inlet to the hydraulic cylinder, means for positively closing or holding closed the said check valve, valve mechanism for controlling the intensifier, and a single lever and operating connections for successively releasing the check valve from said positive means and then closing the intensifier exhaust and opening the intensifier inlet and separately adjustable means for automatically actuating the said positive valve closing means before reversing the intensifier, whereby the reversal of the intensifier may also cause the reverse movement of the main hydraulic ram.

6. In combination, a hydraulic ram, a steam actuated intensifier therefor, a hydraulic accumulator for the ram, and a steam actuated plunger acting elastically on the accumulator and a force pump supplying the accumulator and a valve acting with the said plunger for controlling the said force pump.

7. In combination, a hydraulic ram a steam actuated intensifier therefor, a hydraulic accumulator for the ram and a steam actuated plunger acting elastically on the accumulator, means for preventing or allowing inlet of water at will to the said ram during the return stroke of the intensifier, whereby either a reciprocation or progressive action of the intensifier stroke of the ram results at will substantially as described the last said means comprising an adjustable mechanism for varying the control of the water inlet.

8. In combination, a main ram, an accumulator supplying it one or more pull back cylinders in constant communication with the accumulator, inlet and outlet valves for controlling the ram, an intensifier, a valve therefor, and a hand lever and connections therefrom for controlling the said valves of both the ram and the intensifier and a manually controlled means for varying the control of the inlet valve of the ram to either allow or prevent admission during the back stroke of the intensifier.

9. In combination, a main ram, an accumulator supplying it, one or more pull back cylinders in constant communication with the accumulator, main and pilot valves for controlling the ram, an intensifier, a valve therefor, and a hand lever and connections therefrom for controlling the said valves of both the ram and the intensifier and a separate adjusting means for varying the control of the main ram inlet to cause or prevent at will a retreat of the ram during the intensifier back stroke.

10. The combination of a main ram cylinder an intensifier cylinder coacting therewith, a controlling valve and valve mechanism for the intensifier, an inlet check valve and an outlet valve for the main cylinder, actuating means therefor connected to also control the intensifier valve mechanism, the last said actuating means comprising means for automatically closing or holding closed the said inlet check valve at a given point in the movement of the actuating means preceding the admission of pressure to the intensifier.

11. The combination of a main ram cylinder, an intensifier cylinder coacting therewith, a controlling valve and valve mechanism for the intensifier, an inlet check valve and an outlet valve for the main cylinder, actuating means therefor connected to also control the intensifier valve mechanism, the last said actuating means comprising means for automatically closing or holding closed the said inlet check valve.

12. In combination, a hydraulic ram, an intensifier therefor, and ram controlling means comprising a water inlet check valve, an outlet valve that closes with the pressure outward, and positive means for opening the outlet valve and positive means for preventing the opening of said inlet check valve at will.

13. In combination, a hydraulic ram, an intensifier therefor, and ram controlling means comprising a water inlet check valve, an outlet valve that closes with the pressure outward, and positive means for opening the outlet valve and positive means for preventing the opening of said inlet check valve at will, a lever and connections therefrom for operating both said positive means.

14. In combination, a hydraulic ram, an intensifier therefor, and ram controlling means comprising a water inlet check valve, an outlet valve that closes with the pressure outward, and positive means for opening the outlet valve and positive means for preventing the opening of said inlet check valve at will, a lever and connections therefrom for operating both said positive means, and means for varying the lever connections and thereby the operation.

15. In combination, a hydraulic ram, an intensifier therefor means for controlling the inlet and outlet of water to and from the ram, including an automatic inlet check valve, a hand controlling lever and positive valve closing means controlled by said lever for closing or holding closed the water inlet at a predetermined position of the controlling lever and a setting lever and means actuated thereby for varying the application of the last said means at will.

16. In combination, a hydraulic ram, an intensifier therefor means for controlling the inlet and outlet of water to and from the ram including an automatic inlet check valve, a hand controlling lever and positive valve closing means controlled by said lever for closing or holding closed the water inlet at a predetermined position of the controlling lever and a setting lever and means actuated thereby for varying the application of the last said means at will and preventing or causing the automatic inlet of water between intensifier strokes for the purposes set forth.

17. In combination, a hydraulic ram and means for controlling the flow of water therefor, a steam intensifier therefor having a main steam valve, a piston for actuating the same and a pilot valve controlling the operation of said piston and a hand lever operatively connected to the said ram controlling means and the said pilot valve to actuate them successively by a single motion and means for adjusting at will the said connections and thereby varying the effects of the motion of said lever.

18. In combination, a hydraulic ram and means for controlling the flow of water therefor, a steam intensifier therefor having a main steam valve, a piston for actuating the same and a pilot valve controlling the operation of said piston the said ram controlling means including a water inlet valve and water outlet valve both self closing and means for positively holding the inlet valve shut against pressure.

19. In combination, a hydraulic ram and means for controlling the flow of water therefor, a steam intensifier therefor having a main steam valve, a piston for actuating the same and a pilot valve controlling the operation of said piston, the said ram controlling means including a water inlet valve and water outlet valve both self closing, means for opening the outlet valve and means for positively holding closed the inlet valve.

20. In combination with a hydraulic ram and an intensifier therefor, valve mechanism for controlling the ram, valve mechanism for controlling the intensifier, an operating lever connected to operate both valve mechanisms at different ranges of its motion and a setting lever and mechanism controlled thereby for varying the control of the ram by the first said lever.

21. In combination with a hydraulic ram and an intensifier therefor, valve mechanism for controlling the ram, valve mechanism for controlling the intensifier, an operating lever connected to operate both valve mechanisms at different ranges of its motion and a setting lever and mechanism controlled thereby for varying the control of the ram by the first said lever by either preventing or allowing water to enter the ram when the first said lever is operating the range of motion appropriate to the intensifier, whereby the first said lever may cause either progressive or reciprocating intensifier strokes.

22. In combination a hydraulic ram, an intensifier therefor, an inlet valve for the ram, an outlet valve for the ram, mechanism for controlling the outlet valve, mechanism for controlling the inlet valve having an actuating connection from the said outlet valve controlling mechanism by which it is actuated, and means for automatically disconnecting said actuating connection at a predetermined position of said outlet valve controlling mechanism.

23. In combination a hydraulic ram, an intensifier therefor, an inlet valve for the ram, an outlet valve for the ram, mechanism for controlling the outlet valve, mechanism for controlling the inlet valve having an actuating connection from the said outlet valve controlling mechanism by which it is actuated, and means for automatically disconnecting said actuating connection at a predetermined position of said outlet valve controlling mechanism, said means being adjustable at will to vary the valve control, and mechanism for adjusting said disconnecting means.

24. In combination a hydraulic ram, an intensifier therefor, an inlet valve for the ram, an outlet valve for the ram, mechanism for controlling the outlet valve, mechanism for controlling the inlet valve having an actuating connection from the said outlet valve controlling mechanism by which it is actuated, and means for automatically disconnecting said actuating connection at a predetermined position of said outlet valve controlling mechanism, and a spring connected to actuate the inlet valve controlling mechanism when so disconnected.

25. In combination a hydraulic ram, an intensifier therefor, an inlet valve for the ram, an outlet valve for the ram, mechanism for controlling the outlet valve, mechanism for controlling the inlet valve having an actuating connection from the said outlet valve controlling mechanism by which it is actuated, and means for automatically disconnecting said actuating connection at a predetermined position of said outlet valve controlling mechanism comprising an adjustable cam, and a setting lever and connections therefrom for adjusting said cam, and the said actuating connection including a notched member and pawl which are disengaged by the said cam.

26. In combination a hydraulic ram, an intensifier therefor, inlet and outlet valves for the ram, pilot valves operatively connected to control the said inlet and outlet valves, manually controlled actuating means for actuating the said pilot valves, a pilot valve and main valve for the intensifier and direct mechanical operating connections from said manually controlled actuating means to the pilot valve of the intensifier for controlling it.

27. In combination a hydraulic ram, an intensifier therefor, inlet and outlet valves for the ram, pilot valves operatively connected to control the said inlet and outlet valves, manually controlled actuating means for actuating the said pilot valves, a pilot valve and main valve for the intensifier and direct mechanical operating connections from said manually controlled actuating means to the pilot valve of the intensifier for controlling it and means for disconnecting and separately actuating the pilot valve of the inlet valve to vary the control at will.

In testimony whereof I have signed this specification in the presence of two subscribing witnesses.

CASIMIR von PHILP.

Witnesses:
C. G. NORDSTROM,
C. R. DEIBERT.